April 14, 1936. H. BOATNER 2,037,003
ARTICULATOR
Filed Oct. 28, 1933
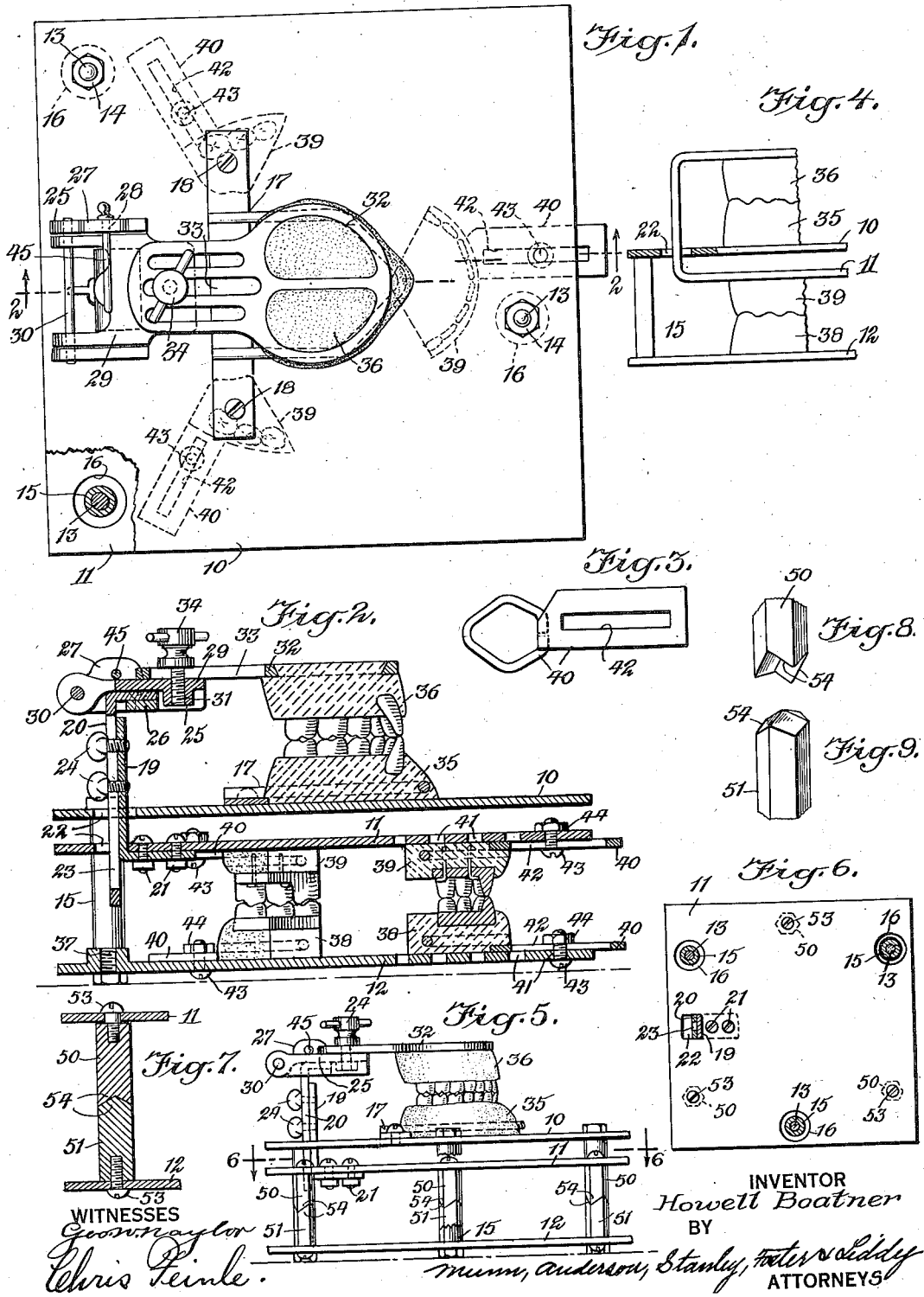
INVENTOR
Howell Boatner
BY
ATTORNEYS Patented Apr. 14, 1936

2,037,003

UNITED STATES PATENT OFFICE 2,037,003

ARTICULATOR

Howell Boatner, Springfield, Mo.

Application October 28, 1933, Serial No. 695,711

5 Claims. (Cl. 32—32)

This invention relates to dental articulators which are used to support for relative movement sets of artifical teeth or dentures in such manner as to simulate the movement of the teeth carried by the human jaws in order to produce sets of artificial teeth or dentures having the proper occlusion and articulation when positioned for use in the mouth of a person requiring the same.

The principal object of the invention is to provide a device or mechanism of the indicated character which will reproduce in a novel manner the natural relative movements of the human jaws, and which enables adjustments so as to vary the occlusion of the opposing teeth of the denture models positioned thereon.

Another object of the invention is to provide an articulator of the indicated character having means which is adjustable for setting the denture model holders by means of replicas or patterns made according to conditions existing in individual cases of patients.

The following specification describes examples of the invention and the claims define the scope of the invention, reference being made to the accompanying drawing forming a part of the specification, by numerals in the specification which correspond to similar numerals on the drawing.

In the drawing—

Figure 1 is a plan view of an articulator constructed in accordance with the invention, a portion thereof being broken away to show certain features and other features being shown in dotted lines;

Fig. 2 is a section taken on the line 2—2 of Figure 1;

Fig. 3 is a perspective view of one of the denture pattern or guide holders;

Fig. 4 is a fragmentary diagrammatic view of the device shown in Figs. 1 and 2;

Fig. 5 is a side elevation of an articulator embodying a modification of the adjusting means for moving the upper jaw denture model;

Fig. 6 is a horizontal section taken on the line 6—6 of Fig. 5;

Fig. 7 is a section showing the parts of one of the adjusting or guiding elements which move the upper jaw denture model;

Figs. 8 and 9 are perspective views, respectively, of the upper and lower parts of the guiding or adjusting element shown in Figs. 5 and 7.

In accordance with the invention as illustrated in Figs. 1 to 4, inclusive, the articulator includes three plates, consisting of a top plate 10, an intermediate plate 11, and a bottom or base plate 12. These plates are similar in size and shape, each being square in the present instance, but it is to be understood that these plates may be of any shape. The top plate and base plate 12 are rigidly connected to each other in horizontal superposed spaced parallel relation by three bolts 13 and nuts 14. The plates 10 and 12 are maintained in spaced parallel relation by tubular spacers 15 which surround the bolts 13. The plate 11 is arranged between the plates 10 and 12, and has openings 16 therein through which the bolts 13 and their spacers 15 extend respectively. The openings 16 are sufficiently large in order to allow the intermediate plate 11 to have the necessary lateral movement in an inclined plane. The top plate 10 has arranged on its upper surface a lower jaw denture model holder 17 of any preferred type, and is fixedly secured as at 18. The holder 17 is positioned so that when the lower jaw denture model is applied thereto, it will be disposed substantially centrally of the plate 10. A vertically adjustable bracket is employed and consists of sections 19 and 20, each of which is of L shape. The bracket section 19 is secured to the plate 11 by suitable fastening elements 21, the plate 11 having an opening 22 to receive the section 19 therethrough and also the section 20, the latter having an elongated slot 23 therein. Set screws 24 carried by the bracket section 19 and extending through the slot 23, engage the section 20 to hold the latter in various desired positions of adjustment. A bearing member 25 is secured to the upper end of the adjustable bracket section 20, as at 26. This member 25 has an upstanding lug 27 on one side, with a hole 28 therein for a purpose to appear. A plate 29 is pivotally or hingedly connected, as at 30, with the bearing member 25. The plate 29 has a boss on the under side thereof, and a tapped hole 31 extends through this plate and said boss. Use is made of an upper jaw denture model holder 32, the same having one or more slots 33 therein to accommodate a set screw 34 which may be screwed in the hole 31 to clamp the holder 32 in various of said positions of adjustment. From the foregoing it will be obvious that the model holder 32 may be adjusted in a plane perpendicular to the plate 11 and also backward and forward with respect thereto. A full lower and upper denture models 35 and 36 are shown applied respectively to the holders 17 and 32, each of said models consisting of the usual plaster of Paris or other suitable material, and artificial teeth.

In accordance with an improved feature of the invention, use is made of means for setting up the artificial teeth of the models 35 and 36 in the production of a denture to suit the particular or individual case. To this end, use is made of denture patterns or guides representing the full lower and upper sets of a patient's teeth. These patterns or guides are made from impressions of the natural teeth. Each of these patterns or guides is cut into three sections, and each of these sections is moved at an angle of 120 degrees with respect to the others in a single plane. The base plate 12 has a tapped hole 37 which accommodates the lower threaded end of a suitable measuring implement for orientating said patterns or guides so that they will have the same relationship on the articulator that they had to the condyle sockets of the patient's head. The teeth of each pattern made from the impression of the natural teeth are preferably of metal, but they may be made of any other suitable material, and said teeth are applied to a suitable composition, such as plaster of Paris. The three sections representing the teeth of the lower set are designated 38, whereas the three sections representing the teeth of the upper set are designated 39. One of the sections of each group carries duplicates of the incisors, cuspids and bicuspids, and the two remaining sections carry the left and right molars. The sections 38 are each applied to a suitable holder 40 of the type in Fig. 3, and each of the sections 39 is also applied to a similar holder 40. The sections 38 are mounted for adjustment on the top of the plate 12, and the sections 39 are mounted for adjustment on the under side of the plate 11. Each of the plates 11 and 12 has three lines of holes 41, which radiate from the center of gravity of the plate, or a central point of the model holder 17 and these lines of holes are spaced 120 degrees with respect to each other. Each holder 40 has a longitudinal slot 42 therein. A set screw 43 is employed for maintaining each one of the holders 40 in adjusted position, it being understood that there is one holder 40 disposed with relation to each series of holes 41. The screw 41 is receivable in any one of the holes 41 and extends through the slot 42 in the related holder 40, and a nut 44 on the screw serves to set up a clamping action to maintain the holder 40 in the desired adjusted position. The sections 38 will cooperate with the sections 39, respectively, it being understood that these sections may be adjusted to cause movement of the intermediate plate 11 and, therefore, the upper denture model 36 laterally or horizontally, or, in other words, the model 36 will be guided in a plane paralleling the plane of movement of the pattern denture section 39. The use of the denture pattern or guide sections 38 and 39 has the advantage that the center of gravity is always within the triangle defined by a line drawn through the three screws 43 of each group; and that stability and continuous contact of the guiding force of the patterns or guide sections 38 and 39 will always be secured.

In using the articulator in conjunction with the denture patterns or guides 38 and 39, a pin 45 is inserted in the hole 28 in the lug 27, and this pin bears on the plate 29 to prevent the same from having swinging or pivotal movement, and maintains the holder 32 substantially parallel to the top plate 10. The pattern or guide sections 38 and 39 may then be used as guiding planes for the movements of the artificial teeth of the models 35 and 36, while being constructed.

Figure 4 is a diagrammatic view of the device shown in Figs. 1 and 2, in order to more clearly exemplify the manner in which the upper denture model 36 may be moved with respect to the lower denture model 35 in accordance with the invention.

In lieu of the denture patterns or guides 38 and 39, use may be made of means shown in Figs. 5 to 9, inclusive. The said means consists of three pairs of elements, the elements of each pair being designated 50 and 51. These pairs of elements 50 and 51 are disposed between the plates 11 and 12, at points so that a line drawn through these points will define an equilateral triangle positioned accurately with respect to the center of gravity of the plate 11. Each of the elements 50 is turnably connected with the plate 11 by a screw 52, and each of the elements 51 is fixedly secured to the plate 12 by a screw 53. The opposing ends of the elements 50 and 51 of each pair have relatively angularly disposed formations 54, which cooperate with each other by turning the element 50. In other words, the elements 50 and 51 having the formations 54, constitute prisms having their faces disposed in a threefold or trigonal symmetry about the opposing ends of the elements 50 and 51, or about their vertical axes, and in which the planes of said faces cooperate with each other to produce the desired movement. It is a well established fact in science that the hemoglobin (oxyhemoglobin) of the blood of various animals possesses the power of crystallizing in various forms in different animals. It is easy to obtain crystals from the blood coloring matter of the guinea pig, rat, squirrel, etc. The hemoglobin of human blood crystallizes in a prismatic form, these prismatic crystals being built up of rhombohedrons, whereas in the blood of the guinea pig the forms are tetrahedral. If the teeth of the human animal be examined by means of the polarizing microscope they will be found to be crystalline in structure, showing that the blood crystals build up the teeth, jaws, etc. It is now a well established fact in crystallography, proven by measurements of hundreds of crystal forms, that the following law is true and is now universally accepted by crystallographers: "In spite of the numberless variations of which the primitive form of a salt or crystal is capable, one thing never varies, but is always constant in each species, namely: The angle of incidence or the respective inclination of the faces to each other". Quoted from "Characters of Crystals", by Alfred J. Moses, page 3.

In tooth or jaw language we would say, in spite of the numberless variations of which the teeth or jaws etc. are capable of taking the dihedral angles between the faces of the crystals that make up their forms never varies. Therefore condyle and teeth crystal inclinations must be the same and obey the general law of crystals.

The crystal forms found in the human body belong in the hexagonal system. An inspection of their formation shows that the dihedral angles are 120° and it is readily determined by mathematics that the plane angles of the faces are 70°31'44" and 109°28'16". These angles constitute one of the three general crystalline formations which must necessarily exist to form a compact mass without intervening spaces between the parts.

If the entire body portion of the human body is made up of various combinations of these crystalline structures it necessarily follows that the exposed portions of the jaws and teeth must be formed of angular surfaces having dihedral angles and plane faces with the above mentioned angularities. It is obvious that the guiding surfaces are made up of numerous numbers of these small crystalline formations with the resultant guiding surfaces forming the angles disclosed above. It is furthermore obvious that this guiding surface may be constructed in the form of a single plane or an infinite number of small planes as it has been shown that the whole is merely a summation of an infinite number of small planes.

The above being true, if articulator guiding surfaces are formed with prismatic numbers following exactly the formation of the crystalline structure which comprises the bony structure of all human bodies, these surfaces when moved relative to each other will necessarily reproduce the movements followed by all human jaws in their excursions during mastication. It will be seen that these guiding surfaces being the same in every human being, they do not vary with facial characteristics and do not depend upon measurements taken from each individual. I, therefore, make the numbers 50 and 51 of a hexagonal formation with the surfaces 54 forming dihedral angles of 120° and with the plane angles of the faces being 109°28'16". Therefore, it will be obvious that the plate 11 may be adjusted by manipulating the elements 50 to cause guided movement of the upper model 36 corresponding to the movement of the plate 11. The movement of the artificial teeth always will be parallel to the planes of the adjusting means described. In this manner the desired occlusion and articulation of the artificial teeth may be obtained.

What is claimed is:

1. A dental articulator comprising an upper jaw denture model holder, a lower jaw denture model holder, a movable support on which said upper jaw model holder is movably mounted, a stationary support beneath said first support and on which said lower jaw model holder is fixedly mounted, and cooperative adjusting means on said supports to adjust the movable support to obtain the desired movement of the upper jaw model holder with respect to the lower jaw model holder, so as to obtain the desired articulation and occlusion of the teeth on the models arranged on said holders respectively, said adjusting means consisting of denture replicas of the teeth of the upper and lower sets of a patient, the replicas representing each set being in sections, and devices arranged to move in a single plane and being spaced one hundred and twenty degrees with respect to a central point of the model holder on the stationary support, and on which devices the sections of each set are arranged respectively.

2. A dental articulator comprising top, intermediate and bottom plates, denture model retaining means on the upper surface of the top plate, said intermediate plate being movable, denture model retaining means carried by said intermediate plate and movable with respect to said first model retaining means, means securing said top and bottom plates in spaced relation, and cooperative means on the intermediate and bottom plates arranged thereon in a single plane for movement in paths radiating from a point in vertical alinement with the center of gravity of the top plate, said cooperative means being manipulatable to move said intermediate plate to adjust the model retaining means carried thereby with respect to other model retaining means.

3. A dental articulator including cooperative groups of denture model holders, one group of holders being movable with respect to the other group which are stationary, the holders of each group each being spaced in relation to the others in the same group, stationary denture retaining means relating to the stationary group of holders, additional denture retaining means, and adjustable means connecting the movable group of holders with the additional denture retaining means so that the latter will be movable with the former, and also movable with respect to the stationary denture retaining means.

4. A dental articulator including two supports one of which is stationary and the other being movable with respect to the former, each support having a group of denture model holders adjustably mounted thereon, one group of holders being disposed to cooperate with the other group, the holders of each group each being adjustable in a single plane and being spaced definitely with respect to a central point common to both groups, denture retaining means carried by and movable with said movable support, and other denture retaining means cooperatively disposed with respect to said first means.

5. A dental articulator comprising top, intermediate and bottom plates, denture model retaining means on the upper surface of the top plate, said intermediate plate being movable, denture model retaining means carried by said intermediate plate and movable with respect to said first model retaining means, means securing said top and bottom plates in spaced relation, and cooperative means on the intermediate and bottom plates arranged thereon in a single plane about a point in vertical alinement with the center of gravity of the top plate, said cooperative means being manipulatable to move said intermediate plate to adjust the model retaining means carried thereby with respect to other model retaining means.

HOWELL BOATNER.